(12) United States Patent
Murata (10) Patent No.: US 11,865,869 B2
(45) Date of Patent: Jan. 9, 2024

(54) PNEUMATIC TIRE

(71) Applicant: The Yokohama Rubber Co., LTD., Tokyo (JP)

(72) Inventor: Takahisa Murata, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 927 days.

(21) Appl. No.: 16/478,468

(22) PCT Filed: Jan. 16, 2018

(86) PCT No.: PCT/JP2018/001004
§ 371 (c)(1),
(2) Date: Jul. 16, 2019

(87) PCT Pub. No.: WO2018/135483
PCT Pub. Date: Jul. 26, 2018

(65) Prior Publication Data
US 2019/0359004 A1 Nov. 28, 2019

(30) Foreign Application Priority Data

Jan. 17, 2017 (JP) ................................ 2017-006133

(51) Int. Cl.
*B60C 11/11* (2006.01)
*B60C 11/12* (2006.01)
(Continued)

(52) U.S. Cl.
CPC ............... *B60C 11/12* (2013.01); *B60C 11/11* (2013.01); *B60C 11/1263* (2013.01);
(Continued)

(58) Field of Classification Search
CPC ......... B60C 11/11; B60C 11/03; B60C 11/12; B60C 11/13; B60C 11/1353;
(Continued)

(56) References Cited

U.S. PATENT DOCUMENTS 2,302,027 A * 11/1942 Havens ................ B60C 11/042
152/DIG. 3
D772,790 S 11/2016 Scheifele
(Continued)

FOREIGN PATENT DOCUMENTS

CN 104870217 8/2015
DE 10 2007 041 682 3/2009
(Continued)

OTHER PUBLICATIONS

International Search Report for International Application No. PCT/JP2018/001004 dated Apr. 10, 2018, 6 pages, Japan.

*Primary Examiner* — Justin R Fischer
*Assistant Examiner* — Philip N Schwartz
(74) *Attorney, Agent, or Firm* — Thorpe North & Western (57) ABSTRACT

Provided is a pneumatic tire. Center blocks provided in a center region of a tread portion are arrayed and form pairs across inclined grooves that are inclined with respect to a tire circumferential direction. Each one of the center blocks extends across a tire equator from one side to the other side of the tire equator. Each one of the center block includes a cut formed of a first wall and a second wall connected in a V-shape in a tread surface. The first wall extends at an angle within ±20° with respect to the tire circumferential direction in the tread surface, and the second wall extends at an angle within ±10° with respect to a tire lateral direction. Each one of wall surface angles of the first wall and the second wall is larger than a wall surface angle of a wall surface provided with the cut.

16 Claims, 5 Drawing Sheets

(51) Int. Cl.
  *B60C 11/13* (2006.01)
  *B60C 11/03* (2006.01)
(52) U.S. Cl.
  CPC ... *B60C 11/1353* (2013.01); *B60C 2011/0341* (2013.01); *B60C 2011/0365* (2013.01); *B60C 2011/1213* (2013.01); *B60C 2011/1361* (2013.01); *B60C 2200/14* (2013.01)
(58) Field of Classification Search
  CPC ......... B60C 11/1263; B60C 2011/0341; B60C 2011/1213; B60C 2011/0365; B60C 2011/1361
  See application file for complete search history.

(56) References Cited

U.S. PATENT DOCUMENTS

| | | | | |
|---|---|---|---|---|
| D811,320 | S * | 2/2018 | Kuwahara | D12/602 |
| 2004/0238092 | A1* | 12/2004 | Colombo | B60C 11/1384 152/209.15 |
| 2006/0032565 | A1* | 2/2006 | Kobayashi | B60C 11/042 152/209.15 |
| 2010/0059157 | A1 | 3/2010 | Ashton et al. | |
| 2010/0200135 | A1* | 8/2010 | Ohara | B60C 13/02 152/209.16 |
| 2014/0174618 | A1 | 6/2014 | Kiwaki | |
| 2015/0336430 | A1* | 11/2015 | Sueyoshi | B60C 11/11 152/209.24 |
| 2017/0120687 | A1 | 5/2017 | Okawara | |

FOREIGN PATENT DOCUMENTS

| | | | |
|---|---|---|---|
| EP | 1 695 844 | 8/2006 | |
| JP | 2015-223884 | 12/2015 | |
| JP | 2016-007861 | 1/2016 | |
| JP | 2016-222207 | 12/2016 | |
| JP | 2017-081439 | 5/2017 | |
| WO | WO 2011/080565 A1 | 7/2011 | |
| WO | WO-2011080565 A1 * | 7/2011 | ........... B60C 11/033 |
| WO | WO 2014/098044 | 6/2014 | |

* cited by examiner

PNEUMATIC TIRE

TECHNICAL FIELD

The present technology relates to a pneumatic tire suitable as a tire used for traveling on unpaved roads, and particularly relates to a pneumatic tire capable of providing driving performance on unpaved roads and the damage-resistance performance of blocks in a compatible manner to a high degree.

BACKGROUND ART

In general, as a pneumatic tire used for traveling on unpaved roads such as an uneven ground surface, a muddy ground surface, a snowy road, a sandy ground surface, and a rocky ground surface, a tire including a tread pattern that mainly includes lug grooves and blocks including a large number of edge components and that has large groove area is employed. In such a tire, traction performance is obtained by biting mud, snow, sand, ballast, rocks, and the like (hereinafter, collectively referred to as "mud and the like") on road surfaces, and the grooves are prevented from being clogged with mud and the like, and driving performance on unpaved roads is improved (for example, see Japan Unexamined Patent Publication No. 2015-223884).

However, in such a tire that has large groove area, there is a problem in that it is difficult to secure block rigidity sufficiently, and the damage-resistance performance of the blocks themselves cannot be obtained sufficiently, and in that the blocks are likely to be damaged during traveling on unpaved roads. Thus, it is required that driving performance on unpaved roads is improved by causing grooves to bite mud and the like effectively while maintaining block rigidity and maintaining the damage-resistance performance of blocks, and a measure to provide driving performance on unpaved roads and the damage-resistance performance of blocks in a compatible manner to a high degree is required.

SUMMARY

The present technology provides a pneumatic tire that is suitable as a tire used for traveling on unpaved roads and that is capable of providing driving performance on unpaved roads and damage-resistance performance in a compatible manner to a high degree.

A pneumatic tire according to an embodiment of the present technology includes a tread portion extending in a tire circumferential direction and having an annular shape, a pair of sidewall portions disposed in both sides of the tread portion, and a pair of bead portions disposed in an inner side of the sidewall portions in a tire radial direction. A plurality of center blocks are provided in a center region of the tread portion. The plurality of center blocks are arrayed and form pairs across inclined grooves that are inclined with respect to the tire circumferential direction and extend. Center blocks in one side of the pairs of the plurality of center blocks extend across a tire equator from one side to the other side of the tire equator, and center blocks in the other side extend across the tire equator from the other side to the one side of the tire equator. Each one of the plurality of center blocks includes a cut formed of two wall surfaces connected to each other in a V-shape in a tread contact surface. In the tread contact surface, the two wall surfaces include a first wall extending at an angle within ±20° with respect to the tire circumferential direction, and a second wall extending at an angle within ±10° with respect to a tire lateral direction. Each one of wall surface angles of the first wall and the second wall is larger than a wall surface angle of a wall surface provided with the cut.

In an embodiment of the present technology, as described above, the center blocks extend across the tire equator. Thus, edge components of the center blocks in the tire lateral direction can be increased, and driving performance on unpaved roads (for example, mud performance and the like) can be improved. Additionally, each of the center blocks includes the cut, and thus the cut can grip mud and the like in the groove effectively. In this case, the extending directions of the first wall and the second wall are set at the above-described angles. Thus, the first wall suppresses a tire skid, and this is advantageous in improving traction performance by the second wall. Additionally, the wall surface angles of the first wall and the second wall are relatively large. Thus, even when the cut is provided, block rigidity can be maintained sufficiently at a high degree, and this is advantageous in improving the damage-resistance performance of the blocks. Note that "wall surface angle" in an embodiment of the present technology refers to an angle formed by a wall surface of a block or a groove with respect to a normal line of the tread contact surface.

In an embodiment of the present technology, preferably the second wall has a length in the tread contact surface form 0.5 times to 2.0 times larger than a length in the tread contact surface of the first wall. A length relationship of the first wall and the second wall is specified as described above, and thus suppression of a skid due to the first wall, and improvement in traction performance due to the second wall can be provided in a well-balanced and compatible manner.

In an embodiment of the present technology, preferably in the tread contact surface, area of a cut region surrounded by the first wall, the second wall, and an extension line of the wall surface provided with the cut is from 5% to 20% of ground contact area of the center block. The size of the cut is set as described above to the appropriate range with respect to the center block, an effect due to the cut (improvement of driving performance on unpaved roads) can be exerted effectively while maintaining satisfactory block rigidity. Note that in an embodiment of the present technology, "ground contact area of the center block" refers to area of a portion actually comes into contact with a ground in the contact surface of the center block (area obtained by excluding a portion such as a chamfered portion that does not actually come into contact with a ground).

In an embodiment of the present technology, preferably a facing block including a wall surface facing the cut is provided in the tread portion. The facing block is provided as described above, and thus mud and the like in a region surrounded by the first wall, the second wall, and the facing block (wall surface facing the cut) is compressed during traveling, and high shear force is obtained. Thus, this is advantageous in improving driving performance on unpaved roads (for example, mud performance and the like).

In this case, preferably, in a region surrounded by the first wall, the second wall, and the wall surface facing the cut of the facing block, a distance in the tread contact surface from an edge point P1 in the facing block side of the first wall to an edge point p1 in the first wall side of the facing block is smaller than a length in the tread contact surface of the second wall, and a distance from an edge point P2 in the facing block side of the second wall and an edge point p2 in the second wall side of the facing block is smaller than a length in the tread contact surface of the first wall. Accordingly, a positional relationship between the facing block and the cut is satisfactory, and an opening portion of the region surrounded by the first wall, the second wall, and the wall surface facing the cut of the facing block is narrow. Thus, mud and the like are compressed effectively in the region surrounded by the first wall, the second wall, and the facing block (wall surface facing the cut) during traveling, and this is advantageous in improving driving performance on unpaved roads (for example, mud performance and the like).

In an embodiment of the present technology, preferably shoulder inclined grooves that are inclined with respect to the tire circumferential direction and extend are provided in shoulder regions in the tread portion, and an inclination direction of the shoulder inclined grooves are opposite to an inclination direction of the inclined grooves. The shoulder inclined grooves are provided as described above, and thus a portion of mud and the like in the center inclined grooves and a portion of mud and the like in the shoulder inclined grooves are likely to flow in the cuts. Accordingly, mud and the like in the cuts is compressed, and shear force is likely to be obtained, and thus this is advantageous in improving driving performance on unpaved roads (for example, mud performance and the like).

In this case, preferably a shoulder block is provided between the shoulder inclined grooves adjacent in the tire circumferential direction, the shoulder block includes at least one wall surface having a wall surface angle larger than a wall surface angle of the center block, and the shoulder inclined grooves have a groove width increased toward a tire equator side. The shoulder block is provided as described above, and thus, when driving performance on unpaved roads (for example, mud performance and the like) is improved by the shoulder block, the rigidity of the shoulder block is improved to obtain damage-resistance performance, and mud and the like in the grooves can also be likely to be discharged.

In this case, preferably a groove bottom protrusion is formed in each of the shoulder inclined grooves, and the groove bottom protrusion extends outward in the tire lateral direction over an outer edge of the shoulder block. The groove bottom protrusion is provided as described above, and thus mud and the like in the shoulder inclined grooves can be likely to be discharged. Note that outer edge of the shoulder block refers to an edge portion of the shoulder block in the outer side in the tire lateral direction in the road contact surface, and refers to an edge formed by the road contact surface of the shoulder block and the side surface of the shoulder block in the outer side in the tire lateral direction.

In an embodiment of the present technology, preferably, in the center region of the tread portion, a connecting groove that connects the inclined grooves adjacent in the tire circumferential direction is provided, and the connecting groove extends at an angle within ±10° with respect to the tire lateral direction in the tread contact surface. Accordingly, traction performance can further be improved by the connecting groove.

In an embodiment of the present technology, preferably in each of the blocks provided in the tread portion, a sipe including at least one end coupled to a groove is formed, and a sipe depth at the end of the sipe coupled to the groove is shallow. Accordingly, an edge effect due to the sipe is obtained, and traction performance is improved. In addition, a decrease in rigidity caused by providing the sipe can be suppressed, and the damage-resistance performance of the blocks can be maintained. Note that, in an embodiment of the present technology, "sipe" refers to a fine groove having a groove width and a groove depth smaller than a groove width and a groove depth of each of various grooves (the inclined groove, the connecting groove, the shoulder inclined groove, and the like described above), and having a groove width of, for example, from 0.5 mm to 1.5 mm, and a groove depth of, for example, from 1.5 mm to 14.0 mm.

In an embodiment of the present technology, various dimensions (a length and an angle) are values measured when a tire is mounted on a regular rim and inflated to a regular internal pressure, and placed vertically on a flat surface with a regular load applied. Note that "road contact surface" of each block refers to a surface portion of each block that actually comes into contact with a flat surface in which a tire is placed under this state, and excludes, for example, a chamfered portion that does not actually come into contact. Additionally, "ground contact edges" are both edge portions in the tire axial direction under this state. "Regular rim" refers to a rim defined by a standard for each tire according to a system of standards that includes standards on which tires are based, and refers to a "standard rim" in the case of JATMA (The Japan Automobile Tyre Manufacturers Association, Inc.), refers to a "Design Rim" in the case of TRA (The Tire and Rim Association, Inc.), and refers to a "Measuring Rim" in the case of ETRTO (The European Tyre and Rim Technical Organisation). "Regular internal pressure" refers to an air pressure defined by standards for each tire according to a system of standards that includes standards on which tires are based, and refers to a "maximum air pressure" in the case of JATMA, refers to the maximum value according to the table of "TIRE ROAD LIMITS AT VARIOUS COLD INFLATION PRESSURES" in the case of TRA, and refers to the "INFLATION PRESSURE" in the case of ETRTO. "Regular internal pressure" is 180 kPa for a tire on a passenger vehicle. "Regular load" is a load defined by a standard for each tire according to a system of standards that includes standards on which tires are based, and refers to a "maximum load capacity" in the case of JATMA, refers to the maximum value according to the table of "TIRE ROAD LIMITS AT VARIOUS COLD INFLATION PRESSURES" in the case of TRA, and refers to "LOAD CAPACITY" in the case of ETRTO.

DETAILED DESCRIPTION

Configurations of embodiments of the present technology will be described in detail below with reference to the accompanying drawings.

Figure 1:
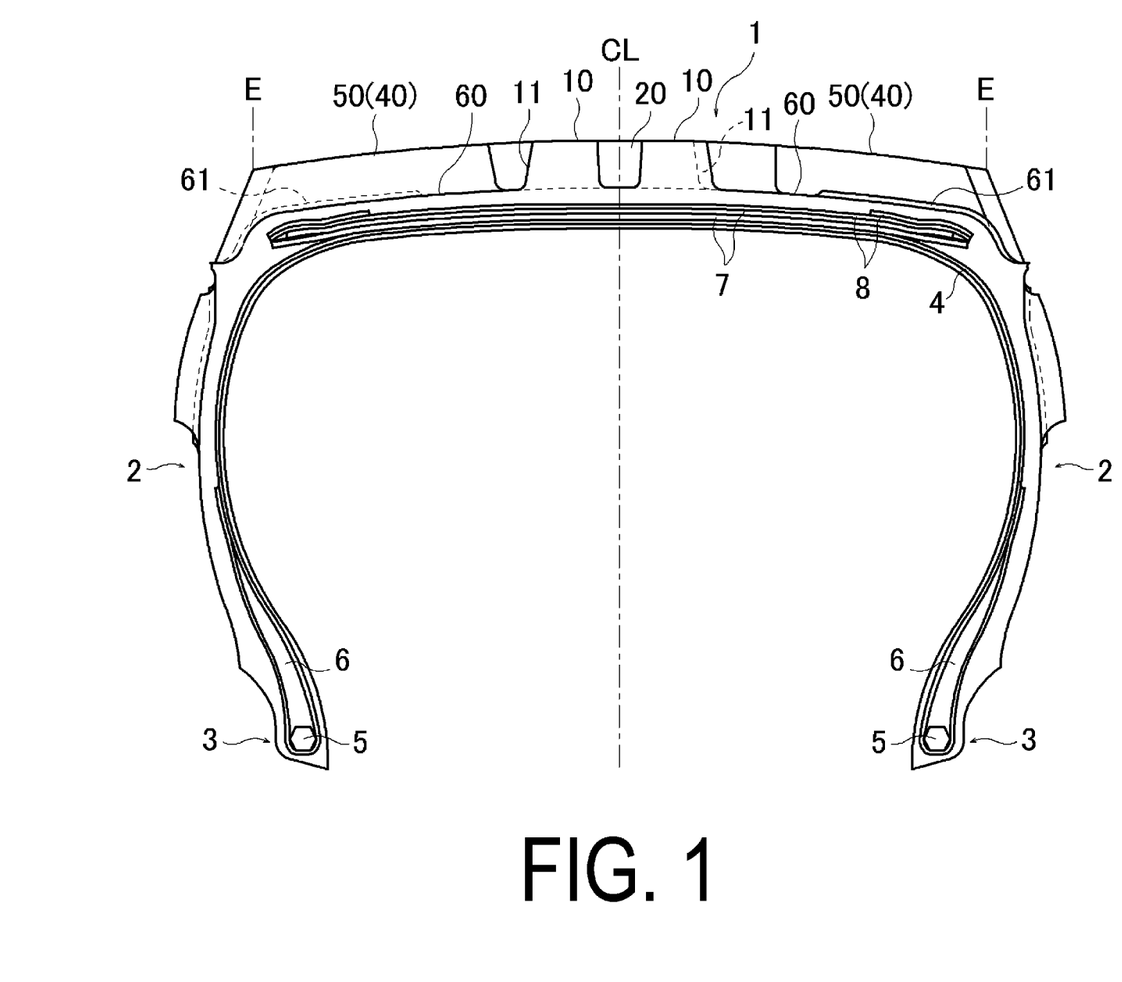
FIG. 1 is a meridian cross-sectional view of a pneumatic tire according to an embodiment of the present technology.

As illustrated in FIG. 1, a pneumatic tire of an embodiment of the present technology includes a tread portion 1 extending in the tire circumferential direction and having an annular shape, a pair of sidewall portions 2 disposed in both sides of the tread portion 1, and a pair of bead portions 3 disposed in an inner side of the sidewall portions 2 in the tire radial direction. Note that in FIG. 1, reference sign CL indicates a tire equator, and reference sign E indicates a ground contact edge.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on an outer circumference of the bead cores 5, and each bead filler 6 is enveloped by a main body portion and a folded back portion of the carcass layer 4. Meanwhile, in the tread portion 1, a plurality of belt layers 7 (two layers in FIG. 1) are embedded in the outer circumferential side of the carcass layer 4. The belt layers 7 each include a plurality of reinforcing cords that are inclined with respect to the tire circumferential direction, and the reinforcing cords of the different layers are disposed and intersect each other. In these belt layers 7, the inclination angle of the reinforcing cords with respect to the tire circumferential direction is set to, for example, the range from 10° to 40°. Further, a belt reinforcing layer 8 is provided in the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The embodiment of the present technology is applied to such a general pneumatic tire; however, the cross-sectional structure of the pneumatic tire is not limited to the basic structure described above.

Figure 2:
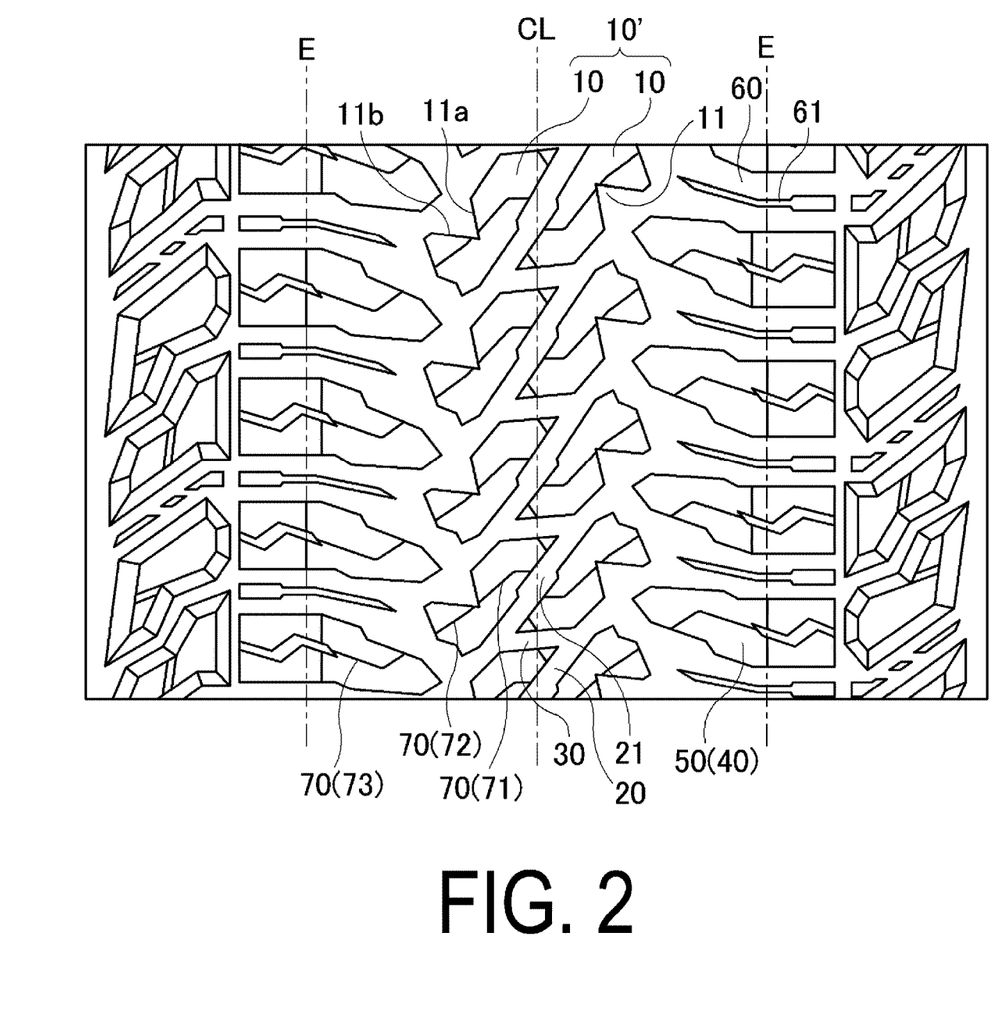
FIG. 2 is a front view illustrating a tread surface of a pneumatic tire according to an embodiment of the present technology.

As illustrated in FIG. 1 and FIG. 2, in a center region in an outer surface of the tread portion 1, a plurality of center blocks 10 are provided. The center blocks 10 are arrayed and paired (block pairs 10') across inclined grooves 20 that are inclined with respect to the tire circumferential direction and extend. Then, the center blocks 10 in one side of the block pairs 10' (the left side of the tire equator in the figure) extend across the tire equator from the one side (the left side of the tire equator in the figure) to the other side (the right side of the tire equator in the figure) of the tire equator, and the center blocks 10 in the other side (the right side of the tire equator in the figure) extend across the tire equator from the other side (the right side of the tire equator in the figure) to the one side (the left side of the tire equator in the figure) of the tire equator.

Figure 3:
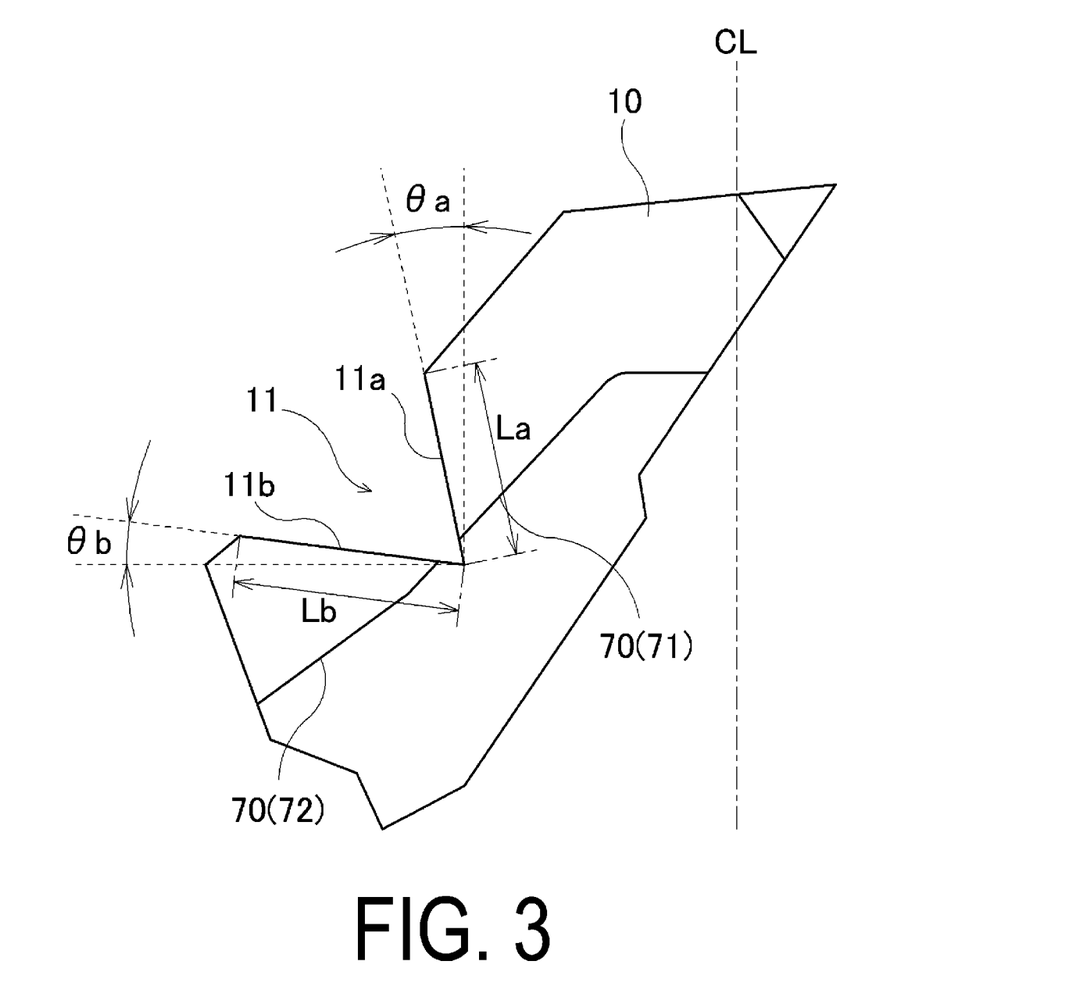
FIG. 3 is an enlarged front view of a center block of FIG. 2.

As illustrated in FIG. 3 in an enlarged manner, in a wall surface of each of the center blocks 10 in the outer side in the tire lateral direction (the wall surface in a side opposite to the inclined groove 20), a cut 11 including two wall surfaces (a first wall 11a and a second wall 11b) connected to each other in a V-shape in the tread contact surface is provided. In the tread contact surface, the first wall 11a extends at an angle within ±20° with respect to the tire circumferential direction, and the second wall 11b extends at an angle within ±10° with respect to the tire lateral direction. That is, in the tread contact surface, an angle θa formed by the first wall 11a with respect to the tire circumferential direction is within ±20°, and an angle θb formed by the second wall 11b with respect to the tire circumferential direction is within ±10°. Additionally, each of the wall surface angles of the first wall 11a and the second wall 11b is larger than the wall surface angle of the wall surface provided with the cut 11.

As described above, the center blocks 10 are provided and form the block pairs 10', and the center blocks 10 extend across the tire equator. Thus, edge components of the center blocks 10 in the tire lateral direction can be increased, and driving performance on unpaved roads (for example, mud performance and the like) can be improved. Additionally, each of the center blocks 10 includes the cut 11, and thus the cut 11 can effectively grip mud and the like in the groove. In this case, the extending directions of the first wall 11a and the second wall 11b are set at the above-described angles. Thus, the first wall 11a can suppress a tire skid, and the second wall 11b can improve traction performance, and this is advantageous in improving driving performance. Additionally, each of the wall surface angles of the first wall 11a and the second wall 11b is relatively larger than each of the wall surface angles of other portions of the center blocks 10. Thus, even when the cut 11 is provided, block rigidity can be maintained sufficiently at a high degree, and this is advantageous in improving the damage-resistance performance of the blocks.

In this case, when the center blocks 10 each have a shape that is not across the tire equator, edge components of the center blocks 10 in the tire lateral direction cannot be secured sufficiently, and driving performance on unpaved roads cannot be improved. When the angle θa of the first wall 11a does not fall within the range of ±20° with respect to the tire circumferential direction, the extending direction in the tread contact surface of the first wall 11a is excessively inclined with respect to the tire circumferential direction. Thus, an edge effect due to the first wall 11a cannot be obtained sufficiently, and a tire skid cannot be suppressed sufficiently. When the angle θb of the second wall 11b does not fall within the range of ±10° with respect to the tire lateral direction, the extending direction in the tread contact surface of the second wall 11b is excessively inclined with respect to the tire lateral direction. Thus, an edge effect due to the first wall 11a cannot be obtained sufficiently, and traction performance cannot be improved sufficiently. When each of the wall surface angles of the first wall 11a and the second wall 11b is smaller than the wall surface angle of the wall surface provided with the cut 11, it is difficult to secure block rigidity sufficiently.

Note that it is only required that the wall surface angles of the first wall 11a and the second wall 11b satisfy the above-described size relationship with respect to the wall surface angle of the wall surface provided with the cut 11. However, a groove wall angle of the first wall 11a can be set to, for example, from 5° to 20°, a groove wall angle of the second wall 11b can be set to, for example, from 5° to 20°, and the wall surface angle of the wall surface provided with the cut 11 can be set to, for example, from 2° to 10°. Then, preferably, each of the wall surface angles of the first wall 11a and the second wall 11b is set to be from 1.5 times to 4.0 times larger than the wall surface angle of the wall surface provided with the cut 11.

In such a center block 10, preferably, a length Lb in the tread contact surface of the second wall 11b is from 0.5 times to 2.0 times larger than a length La in the tread contact surface of the first wall 11a. A length relationship of the first wall 11a and the second wall 11b is specified as described above, and thus suppression of a skid due to the first wall 11a, and improvement in traction performance due to the second wall 11b can be provided in a well-balanced and compatible manner. In this case, when the length Lb of the second wall 11b is smaller than 0.5 times the length La of the first wall 11a, edge traction decreases, and balance of a V-shape of the cut 11 is lost. Thus, shear force due to the cut 11 decreases. When the length Lb of the second wall 11b is larger than 2.0 times the length La of the first wall 11a, a skid cannot be suppressed sufficiently, and balance of a V-shape of the cut 11 is lost. Thus, shear force due to the cut 11 decreases. More preferably, the length Lb in the tread contact surface of the second wall 11b is larger than the length La in the tread contact surface of the first wall 11a, and the length Lb may be set to be from 1.1 times to 2.0 times larger than the length La.

Figure 4A:
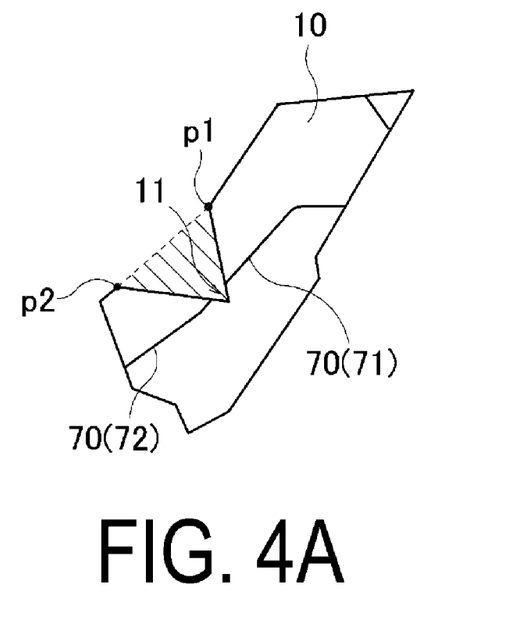
FIGS. 4A and 4B are explanatory views illustrating area of a center block.
Figure 4B:
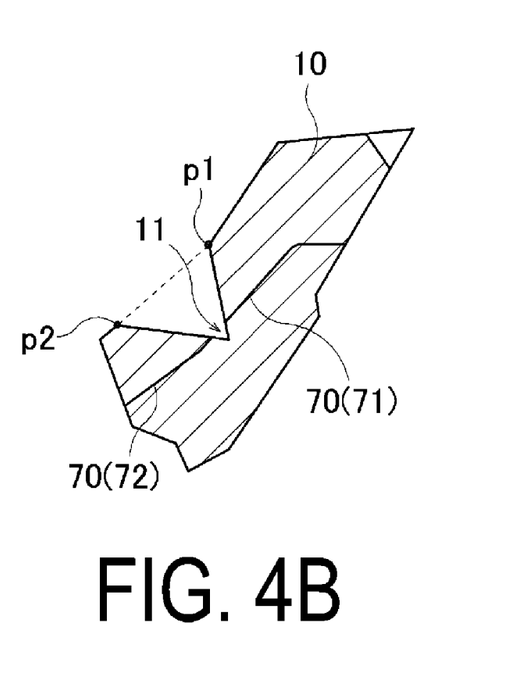

Further, in the center block 10 in an embodiment of the present technology, preferably, in the tread contact surface, area of a cut region surrounded by the first wall 11a, the second wall 11b, and an extension line of the wall surface provided with the cut 11 (a hatched portion of FIG. 4A) is from 5% to 20% of ground contact area of the center block 10 (a hatched portion of FIG. 4B). The size of the cut 11 is set as described above to the appropriate range with respect to the center block 10, and thus an effect (improvement of driving performance on unpaved roads) due to the cut 11 can be exerted effectively while maintaining satisfactory block rigidity. In this case, when the area of the cut region is smaller than 5% of the ground contact area of the center block 10, the cut 11 is excessively small. Thus, shear force due to the cut 11 cannot be obtained sufficiently. When the area of the cut region is larger than 20% of the ground contact area of the center block 10, the cut 11 is excessively large with respect to the center block 10. Thus, it is difficult to maintain satisfactory block rigidity. Note that, as in the illustrated example, in a case where extension directions in the tread contact surface of the wall surface provided with the cut 11 differ from each other in both sides of the cut 11, as an extension line of the wall surface provided with the cut 11, a coupling point of the first wall 11a and the wall surface provided with the cut 11 in the tread contact surface (an edge point p1 in the wall surface side provided with the cut 11 of the first wall 11a) and a coupling point of the second wall 11b and the wall surface provided with the cut 11 (an edge point p2 in the wall surface side provided with the cut 11 of the second wall 11b) are used.

The inclined groove 20 between the two center blocks 10 constituting the block pair 10' may extend at a constant width. However, as in the illustrated example, a broad width portion 21 having a groove width larger than groove widths of other portions of the inclined groove 20 may be provided in the middle of the extending direction of the inclined groove 20 (a portion overlapping with the tire equator CL in the illustrated example) by bending, in the tread contact surface, the wall surface in the inclined groove 20 side of the center block 10. The broad width portion 21 is provided as described above, and thus mud and the like in the broad width portion 21 is pressed during traveling, and shear force is obtained. Thus, this is advantageous in improving driving performance on unpaved roads.

In the center region, a plurality of the block pairs 10' are arrayed in the tire circumferential direction at an interval, and thus grooves are formed between the block pairs 10' adjacent to each other in the tire circumferential direction. As such grooves, as illustrated in the figure, preferably, a connecting groove 30 connecting the inclined grooves 20 adjacent to each other in the tire circumferential direction is provided. Particularly, preferably the connecting groove 30 extends at an angle within ±10° with respect to the tire lateral direction in the tread contact surface. Additionally, preferably the connecting groove 30 is provided at a position intersecting the tire equator CL. the connecting groove 30 is provided as described above, and thus traction performance can further be improved by the connecting groove 30. In this case, when the angle of the connecting groove 30 does not fall within the range of ±10° with respect to the tire lateral direction, the extending direction in the tread contact surface of the connecting groove 30 is excessively inclined with respect to the tire lateral direction. Thus, an edge effect due to the connecting groove 30 cannot be obtained sufficiently, and traction performance cannot be improved sufficiently.

Figure 5:
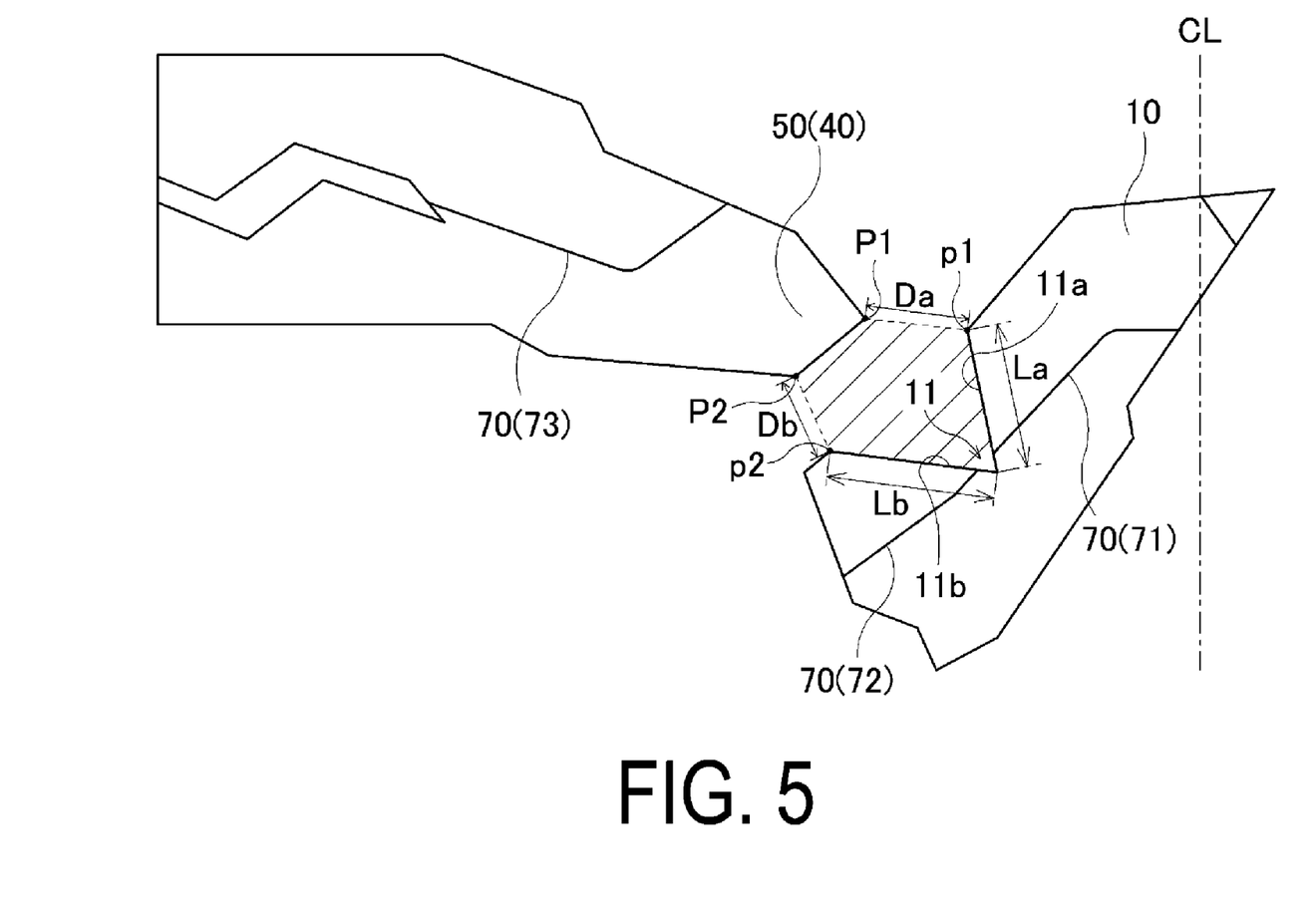
FIG. 5 is an enlarged front view of the vicinity of the center block of FIG. 2.

With regard to the above-described structure of the center region (the structure of the center block 10 and the like), tread patterns of other regions (structures of land portions and grooves other than the center block 10) are not particularly limited. However, as illustrated in FIG. 2 and FIG. 5, preferably a facing block 40 including a wall surface facing the cut 11 is provided. It is only required that the facing block 40 includes the wall surface facing the cuts 11. Thus, as illustrated in FIG. 2 and FIG. 5, a shoulder block 50 provided in a shoulder region may function as the facing block 40. Alternatively, in addition to the center block 10 provided in the center region and the shoulder block 50 provided in the shoulder region, the facing block 40 including the wall surface facing the cut 11 may be provided. In any case, such a facing block 40 is provided, and thus mud and the like in a region (a hatched portion of FIG. 5) surrounded by the first wall 11a, the second wall 11b, and the wall surface facing the cut 11 of the facing block 40 (the shoulder block 50 in FIG. 5) is compressed during traveling, and high shear force is obtained. Thus, this is advantageous in improving driving performance on unpaved roads (for example, mud performance and the like).

In this case, in the region (the hatched portion of FIG. 5) surrounded by the first wall 11a, the second wall 11b, and the wall surface facing the cut 11 of the facing block 40 (the shoulder block 50), preferably a distance Da in the tread contact surface from an edge point P1 in the facing block 40 side (the shoulder block 50 side) of the first wall 11a to an edge point p1 in the first wall 11a side of the facing block 40 (the shoulder block 50) is smaller than the length Lb in the tread contact surface of the second wall 11b, and a distance Db from an edge point P2 in the facing block 40 side (the shoulder block 50 side) of the second wall 11b and an edge point p2 in the second wall 11b side of the facing block 40 (the shoulder block 50) is smaller than the length La in the tread contact surface of the first wall 11a. A positional relationship of the facing block 40 (the shoulder block 50) and the cut 11 is optimized as described above, and thus an opening portion of the region (the hatched portion in FIG. 5) surrounded by the first wall 11a, the second wall 11b, and the wall surface facing the cut 11 of the facing block 40 (the shoulder block 50) is narrow. Thus, mud and the like are compressed effectively in the region surrounded by the first wall 11a, the second wall 11b, and the wall surface facing the cut 11 of the facing block 40 (the shoulder block 50) during traveling, and this is advantageous in improving driving performance on unpaved roads (for example, mud performance and the like). Particularly, to obtain the above-described effect, preferably the distance Da is set to be from 0.4 times to 0.8 times larger than the length Lb and the distance Db is set to be from 0.4 times to 0.8 times larger than the length La.

In an embodiment of the present technology, preferably a plurality of the shoulder blocks 50 are provided in the shoulder regions in addition to the above-described center blocks 10 as in the illustrated example. In this case, between the shoulder blocks 50 adjacent in the tire circumferential direction, shoulder inclined grooves 60, that are inclined with respect to the tire lateral direction and extend are formed. The shoulder block 50 may function as the facing block 40 described above, or may be provided separately from the facing block 40. The shape of the shoulder block 50 may not particularly limited, and may be a shape extending along the tire lateral direction to have a lot of edge components in the tire lateral direction as illustrated in the figure. Additionally, to secure block rigidity, preferably the wall surface angle of at least one wall surface of the shoulder block 50 is larger than the wall surface angle of the center block 10. Particularly, of the wall surfaces constituting the shoulder block 50, the wall surface angle of the wall surface constituting the shoulder inclined groove 60 is set to be larger than the wall surface angle of the center block 10, and this is effective for securing block rigidity. The wall surface angles of the other wall surfaces may be identical to the wall surface angle of the center block 10. The wall surface angle of the wall surface having the large wall surface angle can be set to, for example, from 10° to 20° larger than the wall surface angle of the center block 10 described above (from 2° to 10°).

In the case of providing the shoulder block 50 as described above, preferably the shoulder inclined groove 60 has an inclination direction opposite to an inclination direction of the inclined groove 20 provided in the center region. The shoulder inclined groove 60 is provided as described above, a portion of mud and the like in the inclined groove 20 in the center region and a portion of mud and the like in the shoulder inclined groove 60 are likely to flow in the cut 11. Accordingly, mud and the like in the cut 11 is compressed, and shear force is likely to be obtained. Thus, this is advantageous in improving driving performance on unpaved roads (for example, mud performance and the like). In this case, when the inclination directions of the inclined groove 20 in the center region and the shoulder inclined groove 60 are oriented in the same direction, mud and the like is likely to flow in one direction from the inclined groove 20 in the center region to the shoulder inclined groove 60, and discharge performance of mud and the like is improved. However, an effect due to the cut 11 is difficult to obtain.

The groove width of the shoulder inclined groove 60 may be constant entirely over the length of the shoulder inclined groove 60. However, to improve discharge performance of mud and the like in the grooves, preferably the groove width is larger toward the tire equator CL side as illustrated in the figure. Particularly, when the wall surface angle of the shoulder block 50 is larger than the wall surface angle of the center block 10 to obtain block rigidity as described above, the groove width of the shoulder inclined groove 60 is relatively small. Thus, the groove width is set to be larger toward the tire equator CL side, and thus securing block rigidity, and improvement of discharge performance of mud and the like can be provided in a well-balanced and compatible manner.

In the illustrated example, groove bottom protrusions 61 are formed in the groove bottoms of the shoulder inclined grooves 60. The groove bottom protrusion 61 projects from the groove bottom in the center portion in the groove width direction of the shoulder inclined groove 60, and has a projection height set to be, for example, from 10% to 25% of the groove depth of the shoulder inclined groove 60 and a groove width set to be from 5% to 20% of the groove width of the shoulder inclined groove 60. The groove bottom protrusion 61 prevents mud and the like from being clogged in the groove bottom of the shoulder inclined groove 60, and plays a roll of promoting discharge of mud and the like by vibration of the groove bottom protrusion 61 during traveling. Preferably the groove bottom protrusion 61 extends outward in the tire lateral direction over an outer edge of the shoulder block 50, that is, over an edge of the shoulder block 50 in the outer side in the tire lateral direction in the road contact surface (an edge formed by the road contact surface of the shoulder block 50 and the side surface of the shoulder block 50 in the outer side in the tire lateral direction). The groove bottom protrusion 61 is provided as described above, mud and the like in the shoulder inclined groove 60 can be likely to be discharged effectively.

As described above, the tread portion 1 of an embodiment of the present technology necessarily include the center blocks 10, and optionally include the facing blocks 40 and the shoulder blocks 50. Preferably any of the blocks includes a sipe 70 including at least one end coupled to the groove (the inclined groove 20, the connecting groove 30, the shoulder inclined groove 60, and the like). Then, at the end of the sipe 70 coupled to the groove, a sipe depth may be shallow. For example, in the illustrated example, the center block 10 is provided with a sipe 71 including one end communicating to the connecting groove 30 and the other end communicating to the inclined groove 20 (the cut 11) and a sipe 72 including one end communicating to the inclined groove 20 (the cut 11) and the other end communicating to the shoulder inclined groove 60. Additionally, the shoulder block 50 is provided with a sipe 73 including one end communicating to the shoulder inclined groove 60 and the other end communicating to a recessed portion having a zigzag shape and formed from the road contact surface to the side surface of the shoulder block 50. With regard to the sipes 71, 72, and 73, both the ends of the sipe 71, both the ends of the sipe 72, and the one end of the sipe 73 communicate to the grooves. Thus, the one end and/or the other end of the sipe 71, the one end and/or the other end of the sipe 72, and the one end of the sipe 73 each have a shallow sipe depth. The sipes 70 (the sipes 71, 72, and 73) are provided as described above, and thus an edge effect due to the sipes 70 is obtained, and traction performance is improved. In addition, a decrease in rigidity caused by providing the sipes 70 can be suppressed, and the damage-resistance performance of the blocks can be maintained. Note that in the case of varying the depth of each of the sipes 70, a sipe depth of a relatively shallower portion may be set to be from 0.1 times to 0.4 times larger than a sipe depth of a relatively deep portion in each of the sipes 70.

EXAMPLE

Twenty-two types of pneumatic tires of Conventional Example 1, Comparative Examples 1 to 4, and Examples 1 to 17 were manufactured with a tire size of LT265/70R17, the basic structure illustrated in FIG. 1, and the tread pattern of FIG. 2 as a basic pattern and with the angle θa of the first wall with respect to the tire circumferential direction, the angle θb of the second wall with respect to the tire lateral direction, the wall surface angles of the first wall and the second wall, a ratio Lb/La of the length La of the first wall and the length Lb of the second wall, cut area of the center block with respect to the ground contact area, the angle of the connecting groove with respect to the tire lateral direction, a size relationship between the length La of the first wall and the distance Db, a size relationship between the length Lb of the second wall and the distance Da, an inclination direction of the inclined groove, the wall surface angle of the shoulder block, the groove width variation of the shoulder inclined groove, the position of the outer edge of the groove bottom protrusion, and variation in the sipe depth set as in Table 1 and Table 2.

Note that, with regard to the item "Wall surface angles of first and second walls" in Table 1 and Table 2, the cases where each of the wall surface angles is larger than, the same as, and smaller than the angle of the wall surface provided with the cut are indicated as "Large," "Same," and "Small," respectively. With regard to the item "Inclination direction of shoulder inclined groove" in Table 1 and Table 2, the cases where the inclination direction of the shoulder inclined groove is opposite to and the same as the inclination direction of the inclined groove in the center region are indicated as "Opposite" and "Same," respectively. With regard to the item "Wall surface angle of shoulder block" in Table 1 and Table 2, the cases where the wall surface angle of the shoulder block is larger than and smaller than the wall surface angle of the center block are indicated as "Large" and "Small," respectively. With regard to the item "Groove width variation of shoulder inclined groove" in Table 1 and Table 2, the cases where the groove width of the shoulder inclined groove is larger toward the tire equator side and constant entirely over the length of the shoulder inclined groove are indicated as "Yes" and "No," respectively. With regard to the item "Position of outer edge of groove bottom protrusion" in Table 1 and Table 2, the cases where the groove bottom protrusion extends over the outer edge of the shoulder block and is terminated before the outer edge of the shoulder block are indicated as "Outside" and "Inside," respectively. With regard to the item "Variation in sipe depth" in Table 1 and Table 2, the cases where, at the end of the sipe coupled to the groove, the sipe depth is shallow and constant are indicated as "Yes" and "No," respectively.

These twenty-two types of pneumatic tires were evaluated for mud performance and damage-resistance performance by the evaluation methods described below, and the results are also shown in Table 1 and Table 2.

Mud Performance

The test tires were mounted on wheels having a rim size of 17×8.0, inflated to an air pressure of 450 kPa, and mounted on a test vehicle (pickup truck). Sensory evaluation on traction performance and starting performance was performed by a test driver on a muddy road surface. Evaluation results are expressed as index value with Conventional Example 1 being assigned as the value of 100. Larger index values indicate superior mud performance.

Damage-Resistance Performance

After the evaluation of mud performance, a weight of each tire was measured, and a difference (loss of weight) between the measured weight and the original weight was determined. Evaluation results are expressed as index value with a multiplicative inverse of Conventional Example 1 being assigned as the value of 100. Larger index values indicate smaller loss of weight and superior damage-resistance performance.

TABLE 1

|  |  | Conventional Example 1 | Comparative Example 1 | Comparative Example 2 |
|---|---|---|---|---|
| Angle θa of first wall | ° | 30 | 30 | 15 |
| Angle θb of second wall | ° | 20 | 5 | 20 |
| Wall surface angles of first wall and second wall |  | Same | Same | Same |
| Ratio Lb/La |  | 3.0 | 3.0 | 3.0 |
| Cut area | % | 3 | 3 | 3 |
| Angle of connecting groove | ° | 30 | 30 | 30 |
| Relationship between length La and distance Db |  | La < Db | La < Db | La < Db |
| Relationship between length Lb and distance Da |  | La < Db | La < Db | La < Db |
| Inclination direction of shoulder inclined groove |  | Opposite | Opposite | Opposite |
| Wall surface angle of shoulder block |  | Same | Same | Same |
| Groove width variation of shoulder inclined groove |  | No | No | No |
| Position of outer edge of groove bottom protrusion |  | Inside | Inside | Inside |
| Variation in sipe depth |  | No | No | No |
| Mud performance | Index value | 100 | 102 | 101 |
| Damage-resistance performance | Index value | 100 | 98 | 98 |

|  |  | Comparative Example 3 | Comparative Example 4 | Example 1 | Example 2 |
|---|---|---|---|---|---|
| Angle θa of first wall | ° | 15 | 15 | 15 | 0 |
| Angle θb of second wall | ° | 5 | 5 | 5 | 0 |
| Wall surface angles of first wall and second wall |  | Same | Small | Large | Large |
| Ratio Lb/La |  | 3.0 | 3.0 | 3.0 | 3.0 |
| Cut area | % | 3 | 3 | 3 | 3 |
| Angle of connecting groove | ° | 30 | 30 | 30 | 30 |
| Relationship between length La and distance Db |  | La < Db | La < Db | La < Db | La < Db |
| Relationship between length Lb and distance Da |  | La < Db | La < Db | La < Db | La < Db |
| Inclination direction of shoulder inclined groove |  | Opposite | Opposite | Opposite | Opposite |
| Wall surface angle of shoulder block |  | Same | Same | Same | Same |

TABLE 1-continued

|  |  | | | | |
|---|---|---|---|---|---|
| Groove width variation of shoulder inclined groove |  | No | No | No | No |
| Position of outer edge of groove bottom protrusion |  | Inside | Inside | Inside | Inside |
| Variation in sipe depth |  | No | No | No | No |
| Mud performance | Index value | 103 | 103 | 105 | 106 |
| Damage-resistance performance | Index value | 98 | 95 | 104 | 102 |

|  |  | Example 3 | Example 4 | Example 5 | Example 6 |
|---|---|---|---|---|---|
| Angle θa of first wall | ° | 20 | 15 | 15 | 15 |
| Angle θb of second wall | ° | 10 | 5 | 5 | 5 |
| Wall surface angles of first wall and second wall |  | Large | Large | Large | Large |
| Ratio Lb/La |  | 3.0 | 1.3 | 0.5 | 2.0 |
| Cut area | % | 3 | 3 | 3 | 3 |
| Angle of connecting groove | ° | 30 | 30 | 30 | 30 |
| Relationship between length La and distance Db |  | La < Db | La < Db | La < Db | La < Db |
| Relationship between length Lb and distance Da |  | Lb < Da | Lb < Da | Lb < Da | Lb < Da |
| Inclination direction of shoulder inclined groove |  | Opposite | Opposite | Opposite | Opposite |
| Wall surface angle of shoulder block |  | Same | Same | Same | Same |
| Groove width variation of shoulder inclined groove |  | No | No | No | No |
| Position of outer edge of groove bottom protrusion |  | Inside | Inside | Inside | Inside |
| Variation in sipe depth |  | No | No | No | No |
| Mud performance | Index value | 104 | 107 | 105 | 106 |
| Damage-resistance performance | Index value | 104 | 104 | 103 | 104 |

TABLE 2

|  |  | Example 7 | Example 8 | Example 9 | Example 10 |
|---|---|---|---|---|---|
| Angle θa of first wall | ° | 15 | 15 | 15 | 15 |
| Angle θb of second wall | ° | 5 | 5 | 5 | 5 |
| Wall surface angles of first wall and second wall |  | Large | Large | Large | Large |
| Ratio Lb/La |  | 1.3 | 1.3 | 1.3 | 1.3 |
| Cut area | % | 12 | 5 | 20 | 12 |
| Angle of connecting groove | ° | 30 | 30 | 30 | 30 |
| Relationship between length La and distance Db |  | La < Db | La < Db | La < Db | La > Db |
| Relationship between length Lb and distance Da |  | Lb < Da | Lb < Da | Lb < Da | Lb > Da |
| Inclination direction of shoulder inclined groove |  | Opposite | Opposite | Opposite | Opposite |
| Wall surface angle of shoulder block |  | Same | Same | Same | Same |
| Groove width variation of shoulder inclined groove |  | No | No | No | No |
| Position of outer edge of groove bottom protrusion |  | Inside | Inside | Inside | Inside |
| Variation in sipe depth |  | No | No | No | No |
| Mud performance | Index value | 109 | 108 | 110 | 114 |
| Damage-resistance performance | Index value | 103 | 104 | 102 | 104 |

TABLE 2-continued

|  |  | Example 11 | Example 12 | Example 13 | Example 14 |
|---|---|---|---|---|---|
| Angle θa of first wall | ° | 15 | 15 | 15 | 15 |
| Angle θb of second wall | ° | 5 | 5 | 5 | 5 |
| Wall surface angles of first wall and second wall |  | Large | Large | Large | Large |
| Ratio Lb/La |  | 1.3 | 1.3 | 1.3 | 1.3 |
| Cut area | % | 12 | 12 | 12 | 12 |
| Angle of connecting groove | ° | 30 | 5 | 0 | 10 |
| Relationship between length La and distance Db |  | La > Db | La > Db | La > Db | La > Db |
| Relationship between length Lb and distance Da |  | Lb > Da | Lb > Da | Lb > Da | Lb > Da |
| Inclination direction of shoulder inclined groove |  | Same | Opposite | Opposite | Opposite |
| Wall surface angle of shoulder block |  | Same | Same | Same | Same |
| Groove width variation of shoulder inclined groove |  | No | No | No | No |
| Position of outer edge of groove bottom protrusion |  | Inside | Inside | Inside | Inside |
| Variation in sipe depth |  | No | No | No | No |
| Mud performance | Index value | 107 | 117 | 117 | 116 |
| Damage-resistance performance | Index value | 104 | 104 | 104 | 104 |

|  |  | Example 15 | Example 16 | Example 17 |
|---|---|---|---|---|
| Angle θa of first wall | ° | 15 | 15 | 15 |
| Angle θb of second wall | ° | 5 | 5 | 5 |
| Wall surface angles of first wall and second wall |  | Large | Large | Large |
| Ratio Lb/La |  | 1.3 | 1.3 | 1.3 |
| Cut area | % | 12 | 12 | 12 |
| Angle of connecting groove | ° | 5 | 5 | 5 |
| Relationship between length La and distance Db |  | Lb > Da | Lb > Da | Lb > Da |
| Relationship between length Lb and distance Da |  | Lb > Da | Lb > Da | Lb > Da |
| Inclination direction of shoulder inclined groove |  | Opposite | Opposite | Opposite |
| Wall surface angle of shoulder block |  | Large | Large | Large |
| Groove width variation of shoulder inclined groove |  | Yes | Yes | Yes |
| Position of outer edge of groove bottom protrusion |  | Inside | Inside | Outside |
| Variation in sipe depth |  | No | Yes | Yes |
| Mud performance | Index value | 120 | 120 | 122 |
| Damage-resistance performance | Index value | 106 | 108 | 108 |

As apparent from Table 1 and Table 2, any of Examples 1 to 17 improved mud performance and damage-resistance performance as compared to Conventional Example 1. Note that, evaluation was made only on mud performance on muddy road surfaces. However, even in the case of traveling on other unpaved roads (snowy roads, sand ground surfaces, rocky ground surfaces, and the like), the tire of an embodiment of the present technology exerts the similar function with respect to snow, sand, ballast, rocks, and the like on road surfaces as in the case of traveling on muddy roads. Thus, excellent driving performance on unpaved roads can be exerted, and excellent damage-resistance performance can also be obtained.

Meanwhile, in Comparative Examples 1 and 2, the angle of the first wall or the second wall (θa or θb) was excessively large, and thus an effect of improving mud performance was not able to be obtained sufficiently. Additionally, each of the wall surface angles of the first wall and the second wall was the same as the angle of the wall surface provided with the cut of the center block, and thus damage-resistance performance was degraded. In Comparative Examples 3 and 4, each of the wall surface angles of the first wall and the second wall was the same as the angle of the wall surface provided with the cut of the center block, and thus damage-resistance performance was degraded.

The invention claimed is:
1. A pneumatic tire, comprising:
a tread portion extending in a tire circumferential direction and having an annular shape;
a pair of sidewall portions disposed in both sides of the tread portion; and
a pair of bead portions disposed in an inner side of the sidewall portions in a tire radial direction,
a plurality of center blocks being provided in a center region of the tread portion,
the plurality of center blocks being arrayed and forming pairs across inclined grooves that are inclined with respect to a tire circumferential direction, center blocks in one side of the pairs of the plurality of center blocks extending across a tire equator from one side to an other side of the tire equator, and center blocks in the other side extending across the tire equator from the other side to the one side of the tire equator, each one of the plurality of center blocks including a cut formed of two wall surfaces connected to each other in a V-shape in a tread contact surface, and in the tread contact surface, the two wall surfaces including:

a first wall extending at an angle within ±20° with respect to the tire circumferential direction;

a second wall extending at an angle within ±10° with respect to a tire lateral direction; and in the tread contact surface, an area of a cut region surrounded by the first wall, the second wall, and an extension line of the wall surface provided with the cut being from 10% to 20% of ground contact area of the center block.

2. The pneumatic tire according to claim 1, wherein the second wall has a length in the tread contact surface from 0.5 times to 2.0 times larger than a length in the tread contact surface of the first wall.

3. The pneumatic tire according to claim 1, wherein a facing block including a wall surface facing the cut is provided in the tread portion.

4. The pneumatic tire according to claim 3, wherein, in a region surrounded by the first wall, the second wall, and the wall surface facing the cut of the facing block, a distance in the tread contact surface from an edge point P1 in a facing block side of the first wall to an edge point p1 in the first wall side of the facing block is smaller than a length in the tread contact surface of the second wall, and a distance from an edge point P2 in a facing block side of the second wall to an edge point p2 in the second wall side of the facing block is smaller than a length in the tread contact surface of the first wall.

5. The pneumatic tire according to claim 1, wherein shoulder inclined grooves that are inclined with respect to the tire circumferential direction and extend are provided in shoulder regions in the tread portion, and an inclination direction of the shoulder inclined grooves are opposite to an inclination direction of the inclined grooves.

6. The pneumatic tire according to claim 5,
wherein a shoulder block is provided between the shoulder inclined grooves adjacent in the tire circumferential direction, and
the shoulder inclined grooves have a groove width increased toward a tire equator side.

7. The pneumatic tire according to claim 6, wherein a groove bottom protrusion is formed in each of the shoulder inclined grooves, and the groove bottom protrusion extends outward in the tire lateral direction over an outer edge of the shoulder block.

8. The pneumatic tire according to claim 1,
wherein, in the center region of the tread portion, a connecting groove that connects the inclined grooves adjacent in the tire circumferential direction is provided, and
the connecting groove extends at an angle within ±10° with respect to the tire lateral direction in the tread contact surface.

9. The pneumatic tire according to claim 1, wherein in each of blocks provided in the tread portion, a sipe including at least one end coupled to a groove is formed, and a sipe depth at the end of the sipe coupled to the groove is shallow.

10. The pneumatic tire according to claim 2, wherein a facing block including a wall surface facing the cut is provided in the tread portion.

11. The pneumatic tire according to claim 10, wherein, in a region surrounded by the first wall, the second wall, and the wall surface facing the cut of the facing block, a distance in the tread contact surface from an edge point P1 in a facing block side of the first wall to an edge point p1 in the first wall side of the facing block is smaller than a length in the tread contact surface of the second wall, and a distance from an edge point P2 in a facing block side of the second wall to an edge point p2 in the second wall side of the facing block is smaller than a length in the tread contact surface of the first wall.

12. The pneumatic tire according to claim 11, wherein shoulder inclined grooves that are inclined with respect to the tire circumferential direction and extend are provided in shoulder regions in the tread portion, and an inclination direction of the shoulder inclined grooves are opposite to an inclination direction of the inclined grooves.

13. The pneumatic tire according to claim 12,
wherein a shoulder block is provided between the shoulder inclined grooves adjacent in the tire circumferential direction, and
the shoulder inclined grooves have a groove width increased toward a tire equator side.

14. The pneumatic tire according to claim 13, wherein a groove bottom protrusion is formed in each of the shoulder inclined grooves, and the groove bottom protrusion extends outward in the tire lateral direction over an outer edge of the shoulder block.

15. The pneumatic tire according to claim 14,
wherein, in the center region of the tread portion, a connecting groove that connects the inclined grooves adjacent in the tire circumferential direction is provided, and
the connecting groove extends at an angle within ±10° with respect to the tire lateral direction in the tread contact surface.

16. The pneumatic tire according to claim 15, wherein in each of blocks provided in the tread portion, a sipe including at least one end coupled to a groove is formed, and a sipe depth at the end of the sipe coupled to the groove is shallow.

* * * * *